United States Patent [19]

Coenen et al.

[11] Patent Number: 5,642,091
[45] Date of Patent: Jun. 24, 1997

[54] METHOD AND APPARATUS FOR DATA TRANSMISSION IN A TEXTILE MACHINE

[75] Inventors: Norbert Coenen, Mönchengladbach; Erwin Peters, Düren, both of Germany

[73] Assignee: W. Schlafhorst AG & Co., Moenchengladbach, Germany

[21] Appl. No.: 681,224

[22] Filed: Jul. 22, 1996

[30] Foreign Application Priority Data

Jul. 22, 1995 [DE] Germany ............... 195 26 846.6

[51] Int. Cl.⁶ ............................................. H04M 11/04
[52] U.S. Cl. ........................ 340/310.02; 340/310.01
[58] Field of Search ...................... 340/310.02, 310.01, 340/333, 636; 375/257, 259; 364/492, 184, 187; 57/81, 78

[56] References Cited

U.S. PATENT DOCUMENTS 4,463,352  7/1984  Forbes et al. ............... 340/825.05

FOREIGN PATENT DOCUMENTS

| 32642B | 5/1988 | Austria . |
|---|---|---|
| 3117689A1 | 4/1982 | Germany . |
| 3410684A1 | 10/1985 | Germany . |
| 3744208A1 | 7/1989 | Germany . |
| 3914865A1 | 11/1989 | Germany . |
| 3907652A1 | 9/1990 | Germany . |
| 3915456A1 | 11/1990 | Germany . |
| 0451534A1 | 3/1991 | Germany . |
| 3928831A1 | 3/1991 | Germany . |
| 4231317A1 | 4/1993 | Germany . |
| 4212629A1 | 10/1993 | Germany . |
| 4309989A1 | 10/1993 | Germany . |
| 4209785C2 | 4/1994 | Germany . |
| 4413569A1 | 11/1995 | Germany . |

OTHER PUBLICATIONS

Dipl.–Ing. Karl Müller, "Offenes Buskonzept für Schalter, Sensorne, Aktoren", 1992, pp. 82–87.
Elmar Flaschka, "Binäre Sensoren am Bus", Dec. 1994, pp. 64–68.

*Primary Examiner*—Jeffery Hofsass
*Assistant Examiner*—Sihong Huang
*Attorney, Agent, or Firm*—Shefte, Pinckney & Sawyer

[57] ABSTRACT

A method and apparatus for transmitting data within a textile machine of the type having a central main power supply and many identical work or spinning stations is disclosed with the data being for controlling operational at independently operable work stations, particularly in open-end bobbin winding machines. A separate power supply is included for providing a buffer voltage for use at memories within the individual spinning station central units, with the power supply output being DC voltage at a predetermined level. The DC buffer voltage signal is modulated with the data for transmission to the work station, transmitted to the work station and demodulated thereat for use.

11 Claims, 2 Drawing Sheets

METHOD AND APPARATUS FOR DATA TRANSMISSION IN A TEXTILE MACHINE

FIELD OF THE INVENTION

The present invention relates to a method and apparatus for transmitting data in a textile machine of the type having a plurality of individual work stations.

BACKGROUND OF THE INVENTION

Modern textile machines usually function fully automatically, under the operational control of high-performance computers. Generally, the data required to control a textile machine is input into the computer of a central control unit associated with the textile machine, which also collects the event data from the various work stations. The work stations are typically identical spinning stations. In addition, work station-independent data is linked to work station-specific data and then control commands are transmitted to the work stations from the central control unit. The work stations in turn may each include decentralized control units with so-called work station computers, which substantially automatically control the timing and sequence of operational steps performed at the work stations, also referred to herein as a course of work. The data required for this can be transmitted to the work stations from the central control unit or may be entered decentrally at each work station into a memory associated with the work station control unit. In the latter case, only the data ascertained at a central station or point of the textile machine needs to be transmitted to the control units of the work stations. In a spinning machine, such data may include the rotary speeds of the draw-off rollers and winding shaft.

For example, the rotary speed, usually presented as rpm, of the draw-off shaft is measured centrally in a spinning machine and is linked in the central control unit with the ongoing data from the various work stations to determine the wound-up yarn length, which is then associated with the various work stations so as to initiate a bobbin change when the desired length is reached.

German Patent Disclosure DE 39 28 381 A1 discloses how the data exchange between the textile machine work station control units and the textile machine central control unit can be effected and what infrastructure is appropriate for the purpose. In the known textile machine, each work station computer associated with the work station control unit is connected via a data bus to the central control unit computer associated with the textile machine. In other words, the bus system of this kind of multi-station textile machine must be designed so that it can simultaneously transmit substantial amounts of data without interference. In an open-end spinning machine, for instance, up to 300 spinning stations can be connected to the computer of the central control unit over a single shared bus.

To enable correct association of the data with the various work stations, each work station is assigned an address, which is made up of a code. This code must be added upon each data transmission, so that the data can be addressed to the correct work station or associated with the work station that had transmitted the data. The addressing and decoding require computer capacity and time in addition to programming effort and maintenance.

SUMMARY OF THE INVENTION

It is accordingly an object of the present invention to simplify transmission of the data in a textile machine that has many identical work stations.

To that end, the method of the present invention is provided for transmitting data for controlling the timing and sequencing of operative steps performed at work stations associated with a textile machine of the type having a plurality of identical work stations, the data transmissions being from devices that receive the data at a central location in the textile machine to control units at the work stations, wherein the memories associated with the control units are supplied with voltage from a primary central voltage source. The method includes the steps of providing an additional, separate central power supply for maintaining a buffer voltage at work station memories, with the separate central power supply maintaining said buffer voltage in the event of a power failure and transmitting the data to the work stations using the buffer voltage as a data signal carrier.

The method preferably includes the step of using the voltage used as the signal carrier additionally as a buffer voltage for control units associated with the work stations. Further, the method preferably includes the step of using an accumulator to store the buffer voltage used as the signal carrier.

It is preferred that the step of providing an additional central power supply for the buffer voltage used as the signal carrier, and further includes the step of providing an additional central power supply providing the buffer voltage as a direct current voltage. The method may additionally include the steps of modulating said buffer voltage with the data prior to transmission to the work stations, providing means for demodulating said buffer voltage at the work stations and demodulating said buffer voltage at the work stations after transmission.

Preferably, the step of modulating the buffer voltage includes using pulse amplitude modulation, with the various amplitudes of the pulse being each associated with certain data to be transmitted. The method may further include the step of filtering the buffer voltage to remove any amplitude variations in the buffer voltage for supplying the data memories of the work stations.

Carrying out the method is made possible by the apparatus of the invention. To that end the present invention includes an apparatus for transmitting data for controlling the timing and sequencing of operative steps performed at work stations associated with a textile machine of the type having a plurality of identical work stations, with the data transmission being from devices that receive the data at a central location in the textile machine to control units at the work stations, wherein the memories associated with the control units are connected to a primary central voltage supply. The apparatus includes an additional central voltage supply for maintaining a buffer voltage at the memories of the control units of the work stations in the event of a voltage failure in the primary central voltage supply with the additional voltage supply including a pulse transducer. The pulses transducer is configured for receiving data from data receiving devices in communication therewith for modulating the buffer voltage with the data to be transmitted. An assembly is included for transmitting the modulated buffer voltage to said data receiving devices. An additional assembly is provided for demodulating the buffer voltage, with such an assembly being disposed at each of the work stations.

Preferably, the apparatus further includes an assembly for applying the buffer voltage modulated by the pulse transducer to the control units of the work stations. It is preferred that the present invention includes an accumulator for furnishing the buffer voltage to the work stations, with the accumulator being in communication with the memories of the control units associated with the work stations and continuously connected thereto using a dedicated accumulator line with the pulse transducer being disposed in the line from the accumulator to the work stations. It is preferred that the accumulator is continuously connected to a charging unit for recharging for use in the event of voltage failure at the primary voltage supply with said charging unit being connected to the primary voltage supply of the textile machine.

The present invention further preferably includes an electrical arrangement for filtering the buffer voltage to remove any amplitude variations in the buffer voltage, with the electrical arrangement for filtering the buffer voltage being disposed at the control units of the work stations, with said buffer voltage being applied to the memories of the control units.

According to the present invention, a buffer voltage is used for transmitting the data, with the buffer voltage being transmitted over its own line to each of the work stations. In the event of a voltage failure or if the regular voltage supply is turned off, voltage must continue to be applied to the memories of the control units in the various work stations, especially the RAMs. The present invention offers the advantage that separate data transmission lines from data receiving devices disposed at a central location to the various work stations can be omitted. This then eliminates many data line connection points that are subject to possible noise, contact corrosion or damage. As work progresses, damage of this kind can cause severe impairments. While the buffer voltage which used to transmit data is needed at each winding station, it nevertheless may be centrally produced, stored and delivered from a central location.

Simultaneous use of the buffer voltage for the data memory and for data transmission can be accomplished in a simple manner by modulating the direct current voltage used. The modulation can easily be accomplished by means of a pulse transducer.

For example, the rotational frequency of the draw-off rollers which is ascertained at a central point can be transmitted, in order to ascertain the yarn length, to each individual spinning station via the voltage supply line. Moreover, in a spinning machine or bobbin winding machine, it is necessary to know whether a conveyor belt for removing completed bobbins is or is not running, so that at a work station a completed bobbin can be deposited on the belt while it is stopped. The belt travel signal can be picked up at the drive motor of the conveyor belt and transmitted to each work station of the textile machine via the voltage supply line for the buffer voltage.

The data-specific modulation of a direct current can be done by means of voltage interruptions of a defined duration per signal, voltage reductions by a defined amount within a defined time period per signal, and a change of polarity at a defined level in a defined time period per signal. By combining these individual modulation methods, it is possible to transmit more than merely one signal with one voltage. In particular, other signals can be impressed on a strictly periodically occurring signal. Thus the continuous transmission of an rpm signal, pertaining to the draw-off shaft, for instance, can be combined with another, different signal. If the strictly periodically occurring signal for instance comprises a voltage interruption of defined duration, then a polarity change within this length of time can mean an additional signal which for instance indicates that the bobbin conveyor belt is running. A voltage reduction by a defined amount over a defined period of time between the rpm pulses of the draw-off shaft could be associated with an additional signal.

So-called pulse detection is provided for the control units of each of the winding stations for converting the arriving pulses back into the data corresponding to them, effectively demodulating the buffer voltage carrier signal. This data can then be stored in the associated memory of the winding station control unit or used directly to control the winding station.

A modulated or otherwise modified direct voltage cannot be used to supply the memories or to operate the control unit of the work stations. It is therefore converted back into a direct voltage. To that end, parallel to the pulse detection, the modulated voltage can be smoothed again, or in other words, the amplitude variations are removed, for instance by using a filter consisting of a blocking diode and smoothing capacitor.

The invention will be described in further detail in terms of an exemplary embodiment.

DESCRIPTION OF THE PREFERRED EMBODIMENT

Figure 1:
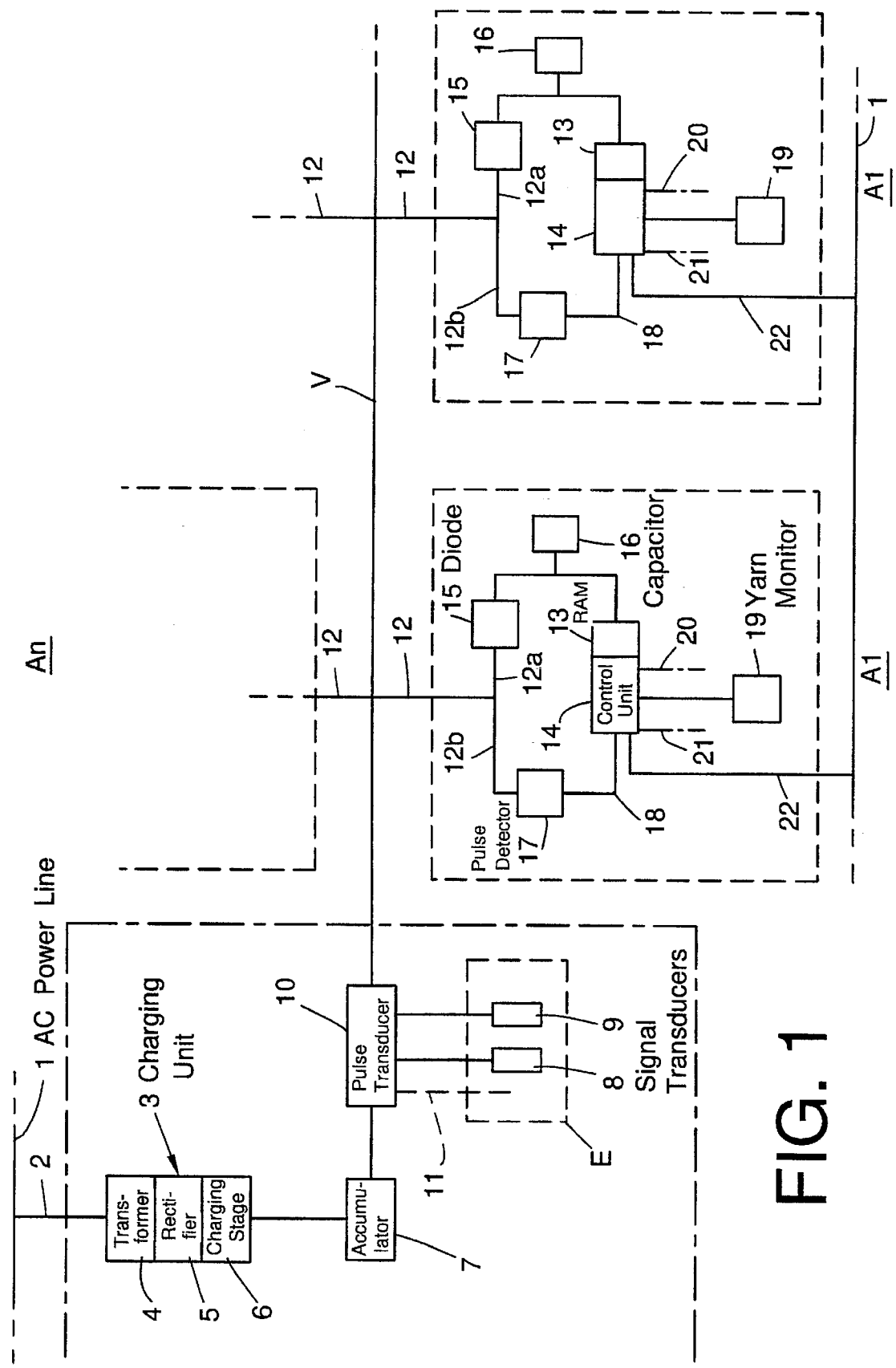
FIG. 1 is a block circuit diagram of the preferred embodiment of the apparatus of the present invention adapted for a spinning machine.

Referring now to the drawings, a block circuit diagram of FIG. 1 shows an emergency power supply associated with a spinning machine that is used to maintain the voltage in the memories of the control units of the various spinning stations if the power supply suddenly fails or the machine is turned off. From the supply line 1 of the spinning machine, a line 2 branches off to a charging unit 3, comprising a transformer 4, where the supply voltage is transformed to a value and rectified in a rectifier 5 so that it is usable to supply the memories of the various spinning stations. Using the charging stage 6, an accumulator 7 is continuously charged. It supplies voltage to the memories in the control units of the spinning stations via the line V if the supply voltage in the line 1 fails.

The emergency power supply is accommodated at a central point Z of the textile machine, for instance in a head part or drive part of the machine. The devices E that ascertain data or keep data available in memory can be located there as well. These devices include the signal transducer 8, which ascertains the rotary pulses of the draw-off shaft, and the pulse transducer 9 on the removal conveyor belt for the completed cross-wound bobbins, which ascertains whether the bobbin conveyor belt is moving.

Both signal transducers 8 and 9 carry their signals on to a pulse transducer 10, which is incorporated into the emergency power supply line V downstream of the accumulator 7. A line illustrated in broken lines is intended to make it clear that still other devices associated with the textile machine, not shown or described here, can transmit signals to the pulse transducer 10.

Using the pulse transducer 10, and in accordance with the present invention, it is possible to transmit data from the devices E to the control units of the spinning stations using the above-described modulation of the voltage. From the line V, which extends along the work or spinning stations $A_1$, $A_2$, ..., $A_n$ of the spinning machine, lines 12 branch off for supplying the memories 13 in the control units 14 of the spinning stations are with voltage.

In a given work station, for example, the work or spinning station indicated at $A_1$, the line 12 divides into branches 12a and 12b. Line 12b includes a blocking diode 15 and a smoothing, or filter capacitor 16 and supplies the RAM memory 13 with voltage. The line 12b ends in a so-called pulse detector 17, which acts to demodulate the buffer voltage. There, the data arriving in the form of voltage pulses is deciphered or demodulated and are supplied, in the form of signals detectable to the control unit 14 and associated with the data, to the control unit 14 of the spinning station over the line 18. On the basis of the data transmitted, the control unit 14 controls the spinning station $A_1$. The same process takes place at the other spinning stations, which are all supplied simultaneously with the modulated voltage by the pulse transducer 10 over the line V.

On the basis of the transmitted data, for example, it is possible for the control unit 14 to calculate the length of the spun yarn wound onto the cross-wound bobbin and, once the intended bobbin fullness has been reached, to interrupt the spinning process and move the cross-wound bobbin to a position from which it can be deposited on the bobbin conveyor belt. The deposition onto the bobbin conveyor belt is done whenever a signal, likewise transmitted from the signal transducer 9 over the line V, tells the control unit 14 that the bobbin conveyor belt is ready to receive a cross-wound bobbin.

Reference numeral 19 indicates a yarn monitor, which may be a yarn cleaner, which in the event of a flaw in the yarn cuts the yarn. Once a yarn has been cut, however, no further yarn is wound onto the cross-wound bobbin, so that the signal of the draw-off shaft signal transducer 8, transmitted by the pulse transducer 10, must be suppressed or rendered inoperative for the period of time that the yarn is interrupted. The line 20 is intended to suggest that on the basis of the signals transmitted over the line V, further control events can be undertaken by the control unit 14. The line 21 shown in broken lines is intended to symbolize the fact that other data which may be supplied from outside, for instance from the spinning box, can have an influence on the control process of the control unit 14. The control unit 14 is supplied with the requisite voltage for the control mode from the supply line 1 over a line 22.

Figure 2:
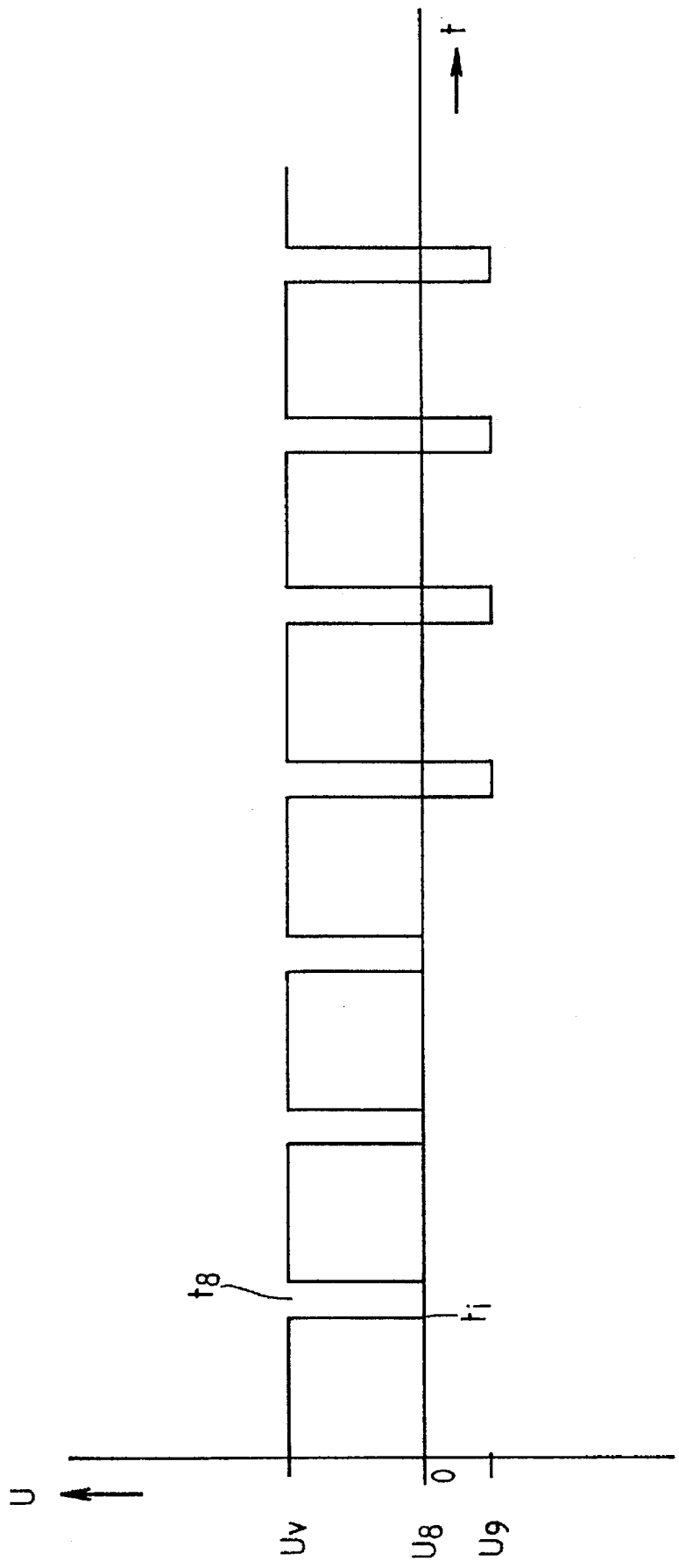
FIG. 2 illustrates the modulation of a voltage on the basis of two signals to be transmitted in a spinning machine.

FIG. 2 shows an exemplary embodiment for a voltage that has been modulated for transmitting data. The voltage and time graph shows the course of a direct current voltage $U_v$.

As in the exemplary embodiment of FIG. 1, this voltage is used to supply the memories associated with the control units of the work stations. At regular time intervals $t_i$, this direct voltage is briefly interrupted for the duration $t_8$. At the end of the pulse $t_8$, after the time $t_i$ and $t_8$ has elapsed, the pair of draw-off rollers have executed precisely one revolution. As a result, the length of yarn drawn off can be ascertained exactly. Because of the constant draw-off speed of the yarn via the pair of draw-off rollers, there is a uniform pulse train, in which the voltage drops, from its level used for supply, to the value $U_8$, in the present case 0 V. In this case, the data transmission is effected by means of a simple voltage interruption.

According to the invention, a further signal can also be impressed on the voltage $U_v$. For instance, if the spinning stations of an open-end spinning machine are to be informed by a central unit that the bobbin conveyor belt is running, then a further signal can be impressed on the voltage $U_v$ by impressing a negative voltage on the voltage during the pulses $t_8$ in order to transmit the rpm signal of the draw-off rollers. As can be seen from the voltage and time graph of FIG. 2, the voltage drops during the pulse $t_8$ to the negative voltage $U_9$. In the control units of the work stations, this pulse train with a negative voltage is interpreted as a signal that the bobbin conveyor belt is moving.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A method for transmitting data for controlling the timing and sequencing of operative steps performed at work stations associated with a textile machine of the type having a plurality of identical work stations, the data transmissions being from devices that receive the data at a central location in the textile machine to control units at the work stations, wherein the memories associated with the control units are supplied with voltage from a primary central voltage source, said method comprising the steps of:

providing an additional, separate central power supply for maintaining a buffer voltage at work station memories, said separate central power supply maintaining said buffer voltage in the event of a power failure; and transmitting the data to said work stations using said buffer voltage as a data signal carrier.

2. A method for transmitting data according to claim 1, and further comprising the step of additionally using the voltage used as the signal carrier voltage as a buffer voltage for control units associated with the work stations.

3. A method for transmitting data according to claim 1, and further comprising the step of using an accumulator to store the buffer voltage used as the signal carrier.

4. A method for transmitting data according to claim 1, and wherein the step of providing an additional central power supply for said buffer voltage used as the signal carrier, includes providing an additional central power supply providing said buffer voltage as a direct current voltage, and the method further comprises the steps of modulating said buffer voltage with the data prior to transmission to the work stations, providing means for demodulating said buffer voltage at the work stations and demodulating said buffer voltage at the work stations after transmission.

5. A method for transmitting data according to claim 4, wherein the step of modulating the buffer voltage includes using pulse amplitude modulation, and that the various amplitudes of the pulses are each associated with certain data to be transmitted.

6. A method for transmitting data according to claim 4, and further comprising the step of filtering the buffer voltage to remove any amplitude variations in the buffer voltage for supplying the data memories of the work stations.

7. An apparatus for transmitting data for controlling the timing and sequencing of operative steps performed at work stations associated with a textile machine of the type having a plurality of identical work stations, the data transmission being from devices that receive the data at a central location in the textile machine to control units at the work stations, wherein the memories associated with the control units are connected to a primary central voltage supply, said apparatus comprising:

- an additional central voltage supply for maintaining a buffer voltage at the memories of the control units of the work stations in the event of a voltage failure in the primary central voltage supply said additional voltage supply including a pulse transducer, said pulse transducer receiving data from data receiving devices in communication therewith for modulating the buffer voltage with the data to be transmitted;
- means for transmitting said modulated buffer voltage to said data receiving devices; and
- means for demodulating the buffer voltage disposed at each of the work stations.

8. An apparatus for transmitting data according to claim 7, and further comprising means for applying the buffer voltage modulated by the pulse transducer to the control units of the work stations.

9. An apparatus for transmitting data according to claim 7, and further comprising an accumulator for furnishing the buffer voltage to the work stations, with said accumulator being in communication with the memories of the control units associated with the work stations, said accumulator being continuously connected thereto using a dedicated accumulator line with the pulse transducer being disposed in said line from the accumulator to the work stations.

10. An apparatus for transmitting data according to claim 9, wherein the accumulator is continuously connected to a charging unit for recharging in the event of voltage failure at the primary voltage supply with said charging unit being connected to the primary voltage supply of the textile machine.

11. An apparatus for transmitting data according to claim 7, and further comprising means for filtering the buffer voltage to remove any amplitude variations in the buffer voltage, said means for filtering the buffer voltage being disposed at the control units of the work stations, with said buffer voltage being applied to the memories of the control units.

* * * * *